(12) United States Patent
Scott et al.

(10) Patent No.: US 8,683,704 B2
(45) Date of Patent: Apr. 1, 2014

(54) PIPE CUTTER

(75) Inventors: John S. Scott, Brookfield, WI (US); Michael Naughton, Dousman, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1066 days.

(21) Appl. No.: 12/667,216

(22) PCT Filed: Jul. 3, 2008

(86) PCT No.: PCT/US2008/069188
§ 371 (c)(1),
(2), (4) Date: Feb. 8, 2010

(87) PCT Pub. No.: WO2009/006587
PCT Pub. Date: Jan. 8, 2009

(65) Prior Publication Data
US 2010/0325894 A1 Dec. 30, 2010

Related U.S. Application Data

(60) Provisional application No. 60/947,706, filed on Jul. 3, 2007.

(51) Int. Cl.
*B26B 15/00* (2006.01)

(52) U.S. Cl.
USPC .................................. 30/228; 30/244; 30/249

(58) Field of Classification Search
USPC .......... 30/228, 93, 95, 97, 244, 245, 247, 249
See application file for complete search history.

(56) References Cited

U.S. PATENT DOCUMENTS

| 1,762,392 A | 6/1930 | Gray |
| 2,220,223 A | 11/1940 | Eerhard et al. |
| 2,716,812 A | 9/1955 | Noonan |
| 2,927,373 A | 3/1960 | Taube |
| 3,052,980 A | 9/1962 | Fieser |
| 3,105,218 A | 9/1963 | Kozinski |
| 3,178,816 A | 4/1965 | Schmid |
| 3,453,914 A | 7/1969 | Lemper et al. |
| 3,524,443 A | 8/1970 | Batlin |
| 3,693,254 A | 9/1972 | Salonen |

(Continued)

FOREIGN PATENT DOCUMENTS

| CA | 1301442 | 5/1992 |
| DE | 3105218 | 9/1982 |

(Continued)

OTHER PUBLICATIONS

GB1000846.4—Examination Report dated Jul. 8, 2011 (3 pages).

(Continued)

*Primary Examiner* — Omar Flores Sanchez
(74) *Attorney, Agent, or Firm* — Michael Best & Friedrich LLP

(57) ABSTRACT

A power tool includes a pipe holder, a knife pivotally coupled to the pipe holder, and a drive mechanism coupled to at least one of the pipe holder and the knife. The drive mechanism is operable to move the at least one of the pipe holder and the knife relative to the other of the pipe holder and the knife. The power tool also includes a motor coupled to the drive mechanism and a power supply electrically coupled to the motor to selectively power the motor for operating the drive mechanism.

16 Claims, 12 Drawing Sheets

(56) References Cited

U.S. PATENT DOCUMENTS

| | | | |
|---|---|---|---|
| 3,942,248 A | | 3/1976 | Sherer et al. |
| 4,283,851 A * | | 8/1981 | Wolter .................. 30/134 |
| 4,368,577 A | | 1/1983 | Babb |
| 4,608,754 A | | 9/1986 | Kloster |
| 4,747,212 A | | 5/1988 | Cavdek |
| 4,769,911 A | | 9/1988 | Araki |
| 4,802,278 A | | 2/1989 | Vanderpol et al. |
| 4,989,322 A * | | 2/1991 | Clayton .................. 30/228 |
| 5,002,135 A | | 3/1991 | Pellenc |
| 5,018,420 A | | 5/1991 | Plomb |
| 5,058,272 A | | 10/1991 | Steube |
| 5,067,240 A | | 11/1991 | You |
| 5,122,092 A * | | 6/1992 | Abdul .................. 452/133 |
| 5,129,158 A | | 7/1992 | Campagna |
| 5,331,742 A | | 7/1994 | Schmode et al. |
| 5,642,566 A | | 7/1997 | Hirabayashi |
| 5,718,051 A | | 2/1998 | Huang |
| 5,758,729 A | | 6/1998 | Undin |
| 5,775,539 A | | 7/1998 | Bates et al. |
| 5,826,341 A | | 10/1998 | Massa |
| 5,829,142 A | | 11/1998 | Rieser |
| 5,836,079 A | | 11/1998 | Cronin et al. |
| 5,909,830 A | | 6/1999 | Bates et al. |
| 5,987,754 A | | 11/1999 | Hirabayashi et al. |
| 6,044,564 A | | 4/2000 | Jeltsch |
| 6,120,363 A | | 9/2000 | Dunn |
| 6,178,643 B1 | | 1/2001 | Erbrick et al. |
| 6,181,032 B1 | | 1/2001 | Marshall et al. |
| 6,370,780 B1 | | 4/2002 | Robertson et al. |
| 6,460,626 B2 | | 10/2002 | Carrier |
| 6,467,172 B1 | | 10/2002 | Jenq |
| 6,513,245 B1 | | 2/2003 | Aubriot |
| 6,553,670 B2 | | 4/2003 | Chang |
| 6,626,792 B2 | | 9/2003 | Vranish |
| 6,637,115 B2 | | 10/2003 | Walsh et al. |
| 6,658,739 B1 * | | 12/2003 | Huang .................. 30/96 |
| 6,935,031 B1 | | 8/2005 | Huang |
| 7,013,567 B2 | | 3/2006 | Myers |
| 7,066,691 B2 | | 6/2006 | Doyle et al. |
| 7,116,071 B2 | | 10/2006 | Glasgow et al. |
| 7,152,325 B2 * | | 12/2006 | Green et al. .................. 30/101 |
| 7,275,469 B2 | | 10/2007 | Chen |
| 7,293,362 B2 | | 11/2007 | Konen |
| 7,331,109 B2 | | 2/2008 | Tu |
| 7,363,711 B2 | | 4/2008 | Janutin et al. |
| 7,406,769 B1 * | | 8/2008 | Toussaint .................. 30/93 |
| 7,544,146 B2 | | 6/2009 | Vranish |
| 7,578,461 B2 | | 8/2009 | Sederberg et al. |
| 7,601,091 B2 | | 10/2009 | Vranish |
| 7,845,080 B2 * | | 12/2010 | Nasiell .................. 30/101 |
| 8,122,797 B2 * | | 2/2012 | Bruurs .................. 83/13 |
| 8,266,991 B2 * | | 9/2012 | Thorson et al. .................. 82/76 |
| 2001/0042631 A1 | | 11/2001 | Carrier |
| 2004/0055164 A1 | | 3/2004 | Molins |
| 2005/0150113 A1 | | 7/2005 | Shultis |
| 2005/0274025 A1 | | 12/2005 | Lin |
| 2006/0053633 A1 * | | 3/2006 | Gurri Molins .................. 30/228 |
| 2006/0087286 A1 | | 4/2006 | Phillips et al. |
| 2006/0092674 A1 | | 5/2006 | Belton et al. |
| 2006/0219039 A1 | | 10/2006 | Vranish |
| 2006/0278057 A1 | | 12/2006 | Wuertemberger |
| 2007/0050984 A1 | | 3/2007 | Bartoluzzi |
| 2007/0214648 A1 * | | 9/2007 | Lazarevic .................. 30/102 |
| 2008/0045374 A1 | | 2/2008 | Weinberg et al. |
| 2008/0201961 A1 | | 8/2008 | Wu et al. |
| 2009/0199407 A1 * | | 8/2009 | Lazarevic .................. 30/95 |
| 2010/0018059 A1 * | | 1/2010 | Huang .................. 30/92 |
| 2010/0077621 A1 * | | 4/2010 | Quigley et al. .................. 30/228 |
| 2011/0061242 A1 * | | 3/2011 | Chen et al. .................. 30/228 |
| 2013/0000130 A1 * | | 1/2013 | Maniwa .................. 30/228 |
| 2013/0036614 A1 * | | 2/2013 | Seigneur .................. 30/151 |
| 2013/0055574 A1 * | | 3/2013 | Nie et al. .................. 30/228 |
| 2013/0055575 A1 * | | 3/2013 | Delmas .................. 30/228 |

FOREIGN PATENT DOCUMENTS

| | | |
|---|---|---|
| DE | 3524443 | 1/1987 |
| EP | 1350428 | 10/2003 |
| EP | 1525958 | 4/2005 |
| GB | 2459829 | 9/2008 |
| JP | 55005270 | 1/1980 |
| JP | 10000509 | 1/1998 |
| JP | 2001204251 | 7/2001 |
| WO | 2006096172 | 9/2006 |
| WO | 2009/006588 | 1/2009 |
| WO | 2009/006596 | 1/2009 |

OTHER PUBLICATIONS

GB1000847.2 Examination Report dated Jul. 8, 2011 (3 pages).
Intellectual Property Office of Great Britain Examination Report for Application No. 1000846.4 dated Nov. 7, 2011, 3 pages.
Intellectual Property Office of Great Britain Examination Report for Application No. 1000847.2 dated Nov. 7, 2011, 4 pages.
PCT/US2008/069188 International Search Report and Written Opinion dated Sep. 30, 2008 (10 pages).
PCT/US08/69209 International Search Report and Written Opinion dated Oct. 7, 2008 (9 pages).
PCT/US2008/069189 International Search Report and Written Opinion dated Oct. 14, 2008 (10 pages).
PCT/US2009/055353 International Search Report and Written Opinion dated Oct. 20, 2009 (7 pages).
PCT/US2009/055371 International Search Report and Written Opinion dated Oct. 20, 2009 (7 pages).
Tech Briefs, "Phase-Oriented Gear Systems", NASA Tech Briefs, Goddard Space Flight Center, Greenbelt, Maryland, available online at: <http://www.techbriefs.com/component/content/article/2425>, Nov. 1, 2007.
Shelley, Tom, "Armed to the Teeth", Eureka, available online at: <http://www.eurekamagazine.co.uk/article/13038/Armed-to-the-teeth.aspx>, Feb. 9, 2008.
Milwaukee Electric Tool, "Milwaukee Introduces New 12-volt Sub-Compact Driver", News and Media—Press Releases, available online at: <http://www.milwaukeetool.com/NewsAndMedia/PressReleases/Details.aspx? PublicationId=954>, Sep. 20, 2007.
Intellectual Property Office of Great Britain Examination Report for Application No. 1000847.2 dated Apr. 9, 2013 (5 pages).
Office Action from the US Patent and Trademark Office for U.S. Appl. No. 12/667,217 dated May 20, 2013 (7 pages).

* cited by examiner

＃ PIPE CUTTER

CROSS-REFERENCE TO RELATED APPLICATIONS

This application claims priority to U.S. Provisional Patent Application No. 60/947,706, entitled "PIPE CUTTER", filed Jul. 3, 2007 by John S. Scott, the entire contents of which is hereby incorporated by reference.

BACKGROUND

The present invention generally relates to power tools and, more specifically, to battery-powered pipe cutters.

Manually-operated pipe cutters perform cutting operations in various ways, such as with sawing motions or by successive ratcheting of a pipe cutter knife through a pipe. Oftentimes, these methods of pipe cutting result in imperfect cuts or, when cutting a pipe of a material such as PVC, snapping of the pipe. Manually-operated pipe cutters also cause ergonomic difficulties for the user. In particular, a user having a relatively small hand size or low hand or wrist strength may experience difficulty completing a pipe cut. Additionally, the use of manually-operated pipe cutters can be time consuming.

SUMMARY

In one embodiment, the invention provides a power tool including a pipe holder, a knife pivotally coupled to the pipe holder, and a drive mechanism coupled to at least one of the pipe holder and the knife. The drive mechanism is operable to move the at least one of the pipe holder and the knife relative to the other of the pipe holder and the knife. The power tool also includes a motor coupled to the drive mechanism and a power supply electrically coupled to the motor to selectively power the motor for operating the drive mechanism.

In another embodiment, the invention provides a power tool including a housing assembly supporting a motor and a drive mechanism and a pipe holder coupled to the housing assembly. The pipe holder is configured to support a pipe. The power tool also includes a knife pivotally coupled to the pipe holder and a battery coupled to the housing assembly. The battery is electrically coupled to the motor to selectively power the motor to drive the drive mechanism. The drive mechanism is operable to move the knife relative to the pipe holder to cut the pipe supported by the pipe holder.

In yet another embodiment, the invention provides a pipe cutter including a housing assembly, a pipe holder coupled to the housing assembly, and a knife pivotally coupled to the pipe holder. The knife and the pipe holder define a slot therebetween for receiving a pipe. The pipe cutter also includes a drive mechanism positioned at least partially within the housing assembly and coupled to at least one of the pipe holder and the knife. The drive mechanism is operable to move the at least one of the pipe holder and the knife relative to the other of the pipe holder and the knife to cut the pipe positioned within the slot. The pipe cutter further includes a motor positioned at least partially within the housing assembly and coupled to the drive mechanism and a battery pack removably coupled to the housing assembly. The battery pack is electrically coupled to the motor to selectively power the motor to operate the drive mechanism for moving the at least one of the pipe holder and the knife relative to the other of the pipe holder and the knife Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 1A:
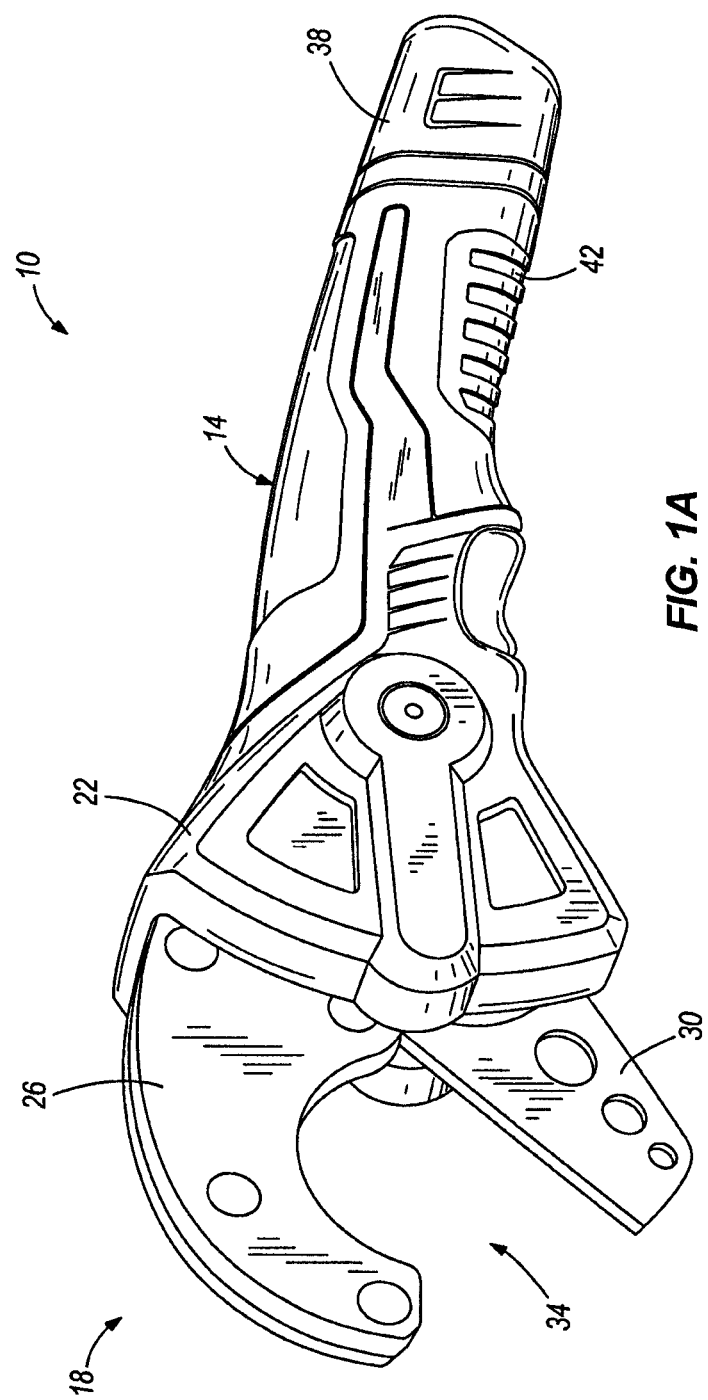
FIG. 1A is a perspective view of a piper cutter according to one embodiment of the invention.

FIG. 1A illustrates a power tool 10 according to one embodiment of the invention. In the illustrated embodiment, the power tool 10 is a pipe cutter operable to cut a variety of pipes. For example, the illustrated pipe cutter 10 can cut a pipe having a 1½ inch inner diameter or less. In other embodiments, the pipe cutter 10 may be configured to cut a pipe having a diameter greater than 1½ inch. In addition, the illustrated pipe cutter 10 is adapted to cut a polyvinyl chloride (PVC) pipe, although a variety of different types of pipes, such as, for example, other types of plastic pipes, metal pipes, or the like, may also be cut with the pipe cutter 10.

Figure 2:
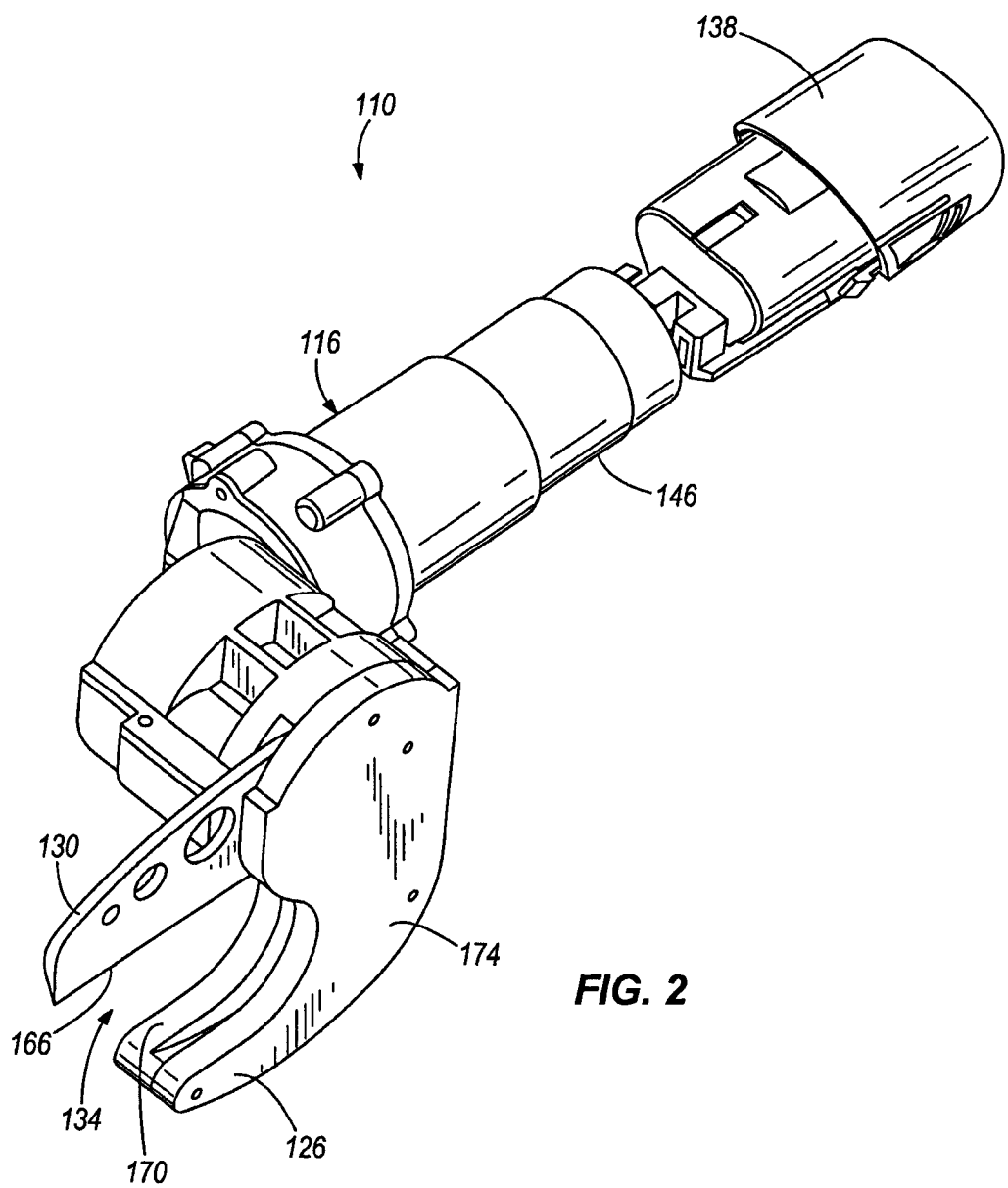
FIG. 2 is a perspective view of a pipe cutter according to yet another embodiment of the invention.

The pipe cutter 10 includes a housing assembly 14, a motor and a drive mechanism (FIG. 2) positioned within the housing assembly 14, and a cutting mechanism 18 coupled to a forward portion 22 of the housing assembly 14. The cutting mechanism 18 includes a pipe holder 26 and a knife 30 defining a slot 34 therebetween. The slot 34 is configured to receive a pipe to be cut by the cutting mechanism 18. The knife 30 is coupled to the motor through the drive mechanism so that operation of the motor moves the knife 30 toward the pipe holder 26 to cut the pipe.

The illustrated pipe cutter 10 also includes a battery pack 38 electrically coupled to the motor such that the pipe cutter 10 is a hand-held, battery-operated power tool. In the illustrated embodiment, the battery pack 38 is a 12-volt power tool battery pack and includes three (3) Lithium-ion battery cells. In other embodiments, the battery pack 38 may include fewer or more battery cells such that the battery pack 38 is a 14.4-volt power tool battery pack, an 18-volt power tool battery pack, or the like. Additionally or alternatively, the battery cells may have chemistries other than Lithium-ion such as, for example, Nickel Cadmium, Nickel Metal-Hydride, or the like. In still other embodiments, the pipe cutter 10 may be a corded power tool.

The battery pack 38, or other power supply, connects to a rearward, or handle, portion 42 of the housing assembly 14 and selectively provides power (e.g., electricity) to the motor to drive the drive mechanism and, thereby, pivot the knife 30. In the illustrated embodiment, the battery pack 38 is partially insertable into the handle portion 42 of the housing assembly 14 to electrically couple to the motor, but may alternatively be coupled to the handle portion 42 by, for example, sliding, snapping, rotating, or the like.

Figure 13:
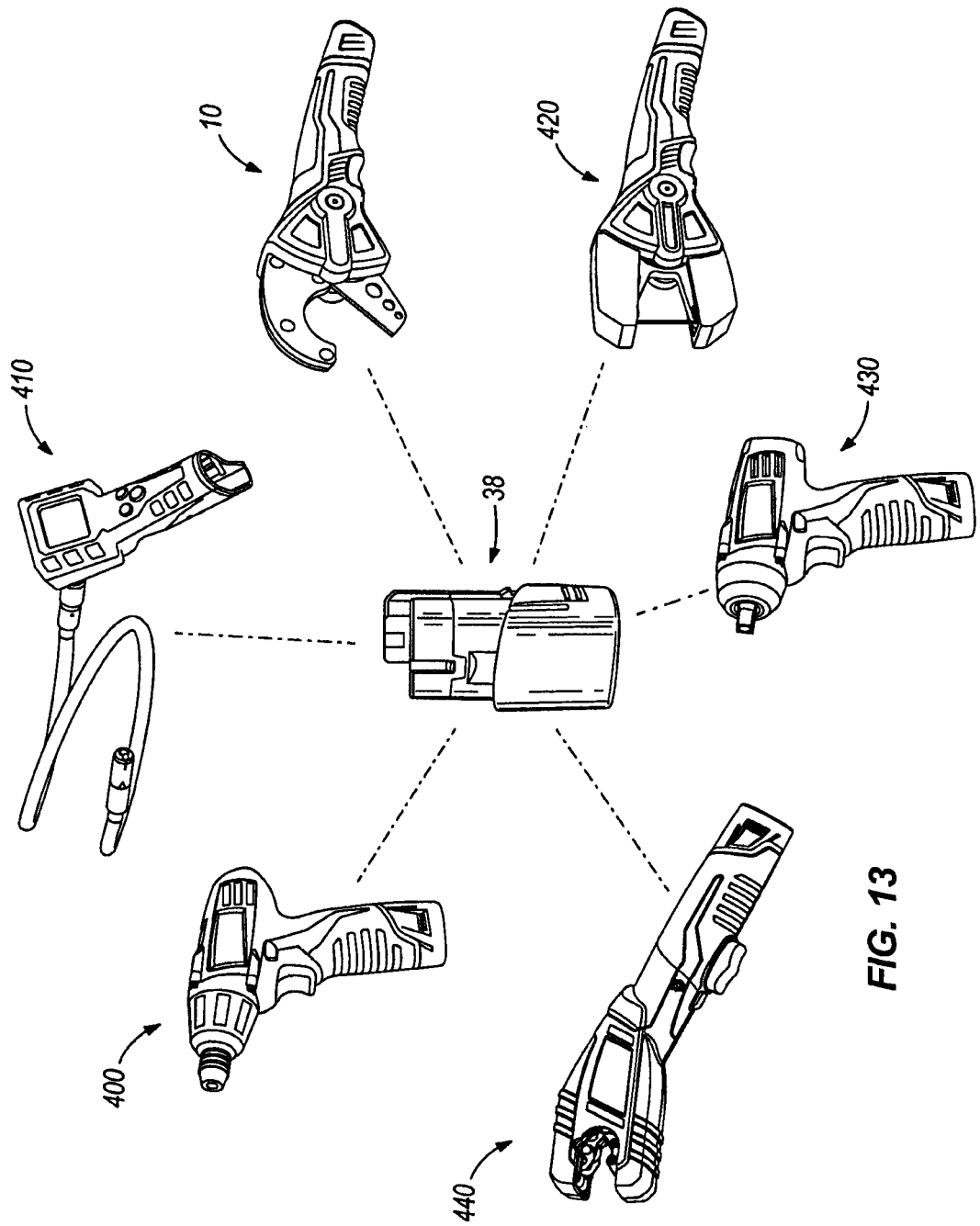
FIG. 13 illustrates a battery pack for use with a variety of power tools.

As shown in FIG. 13, the battery pack 38 is usable with other power tools in addition to the pipe cutter 10. For example, in the illustrated embodiment, the battery pack 38 is also usable with a driver drill 400, a micro-inspection camera 410, a PVC pipe cutter with a wire cutting mechanism 420, an impact driver 430, and a metal pipe cutter 440. Furthermore, the battery pack 38 may be used with other power tools not specifically discussed herein.

Figure 1B:
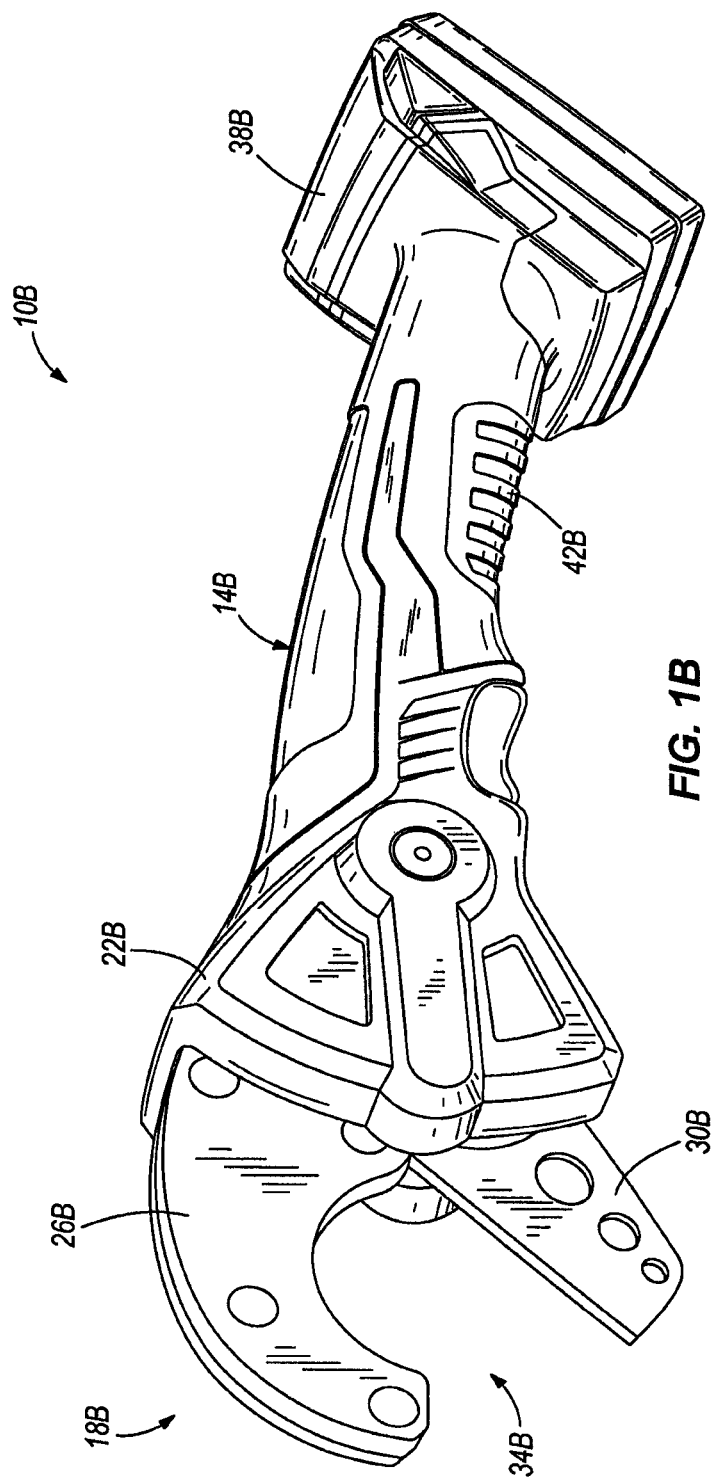
FIG. 1B is a perspective view of a pipe cutter according to another embodiment of the invention.

FIG. 1B illustrates a pipe cutter 10B according to another embodiment of the invention. The illustrated pipe cutter 10B is substantially similar to the pipe cutter 10 shown in FIG. 1A, and like parts have been given the same reference numerals plus a "B" annotation. In the illustrated embodiment, the pipe cutter 10B includes an 18-volt power tool battery pack 38B connected to a handle portion 42B of a housing assembly 14B. The battery pack 38B includes five (5) Lithium-ion battery cells and is coupled to the handle portion 42B by sliding. Similar to the battery pack 38 discussed above, the battery pack 38B may alternatively include fewer or more battery cells, the battery cells may have chemistries other than Lithium-ion, and/or the battery pack 38B may be coupled to the handle portion 42B using other coupling means.

In some embodiments, the pipe cutters 10, 10B may include drive mechanisms configured to quickly return the knives 30, 30B of the pipe cutters 10, 10B to an open position. For example, the pipe cutters 10, 10B may include one of the drive mechanisms illustrated and described in International Patent Application Publication No. WO 2009/006588, entitled "PIPE CUTTER", filed Jul. 3, 2008 by John S. Scott, Michael Naughton, and Scott Eisenhardt, the entire contents of which are hereby incorporated by reference.

In other embodiments, the pipe cutters 10, 10B may include wire cutting mechanisms configured to cut a pipe. For example, the pipe cutters 10, 10B may include one of the wire cutting mechanisms illustrated and described in International Patent Application Publication No. WO 2009/006596, entitled "PIPE CUTTER", filed Jul. 3, 2008 by John S. Scott, the entire contents of which are hereby incorporated by reference.

FIGS. 2-5 illustrate a pipe cutter 110 according to another embodiment of the invention. Similar to the pipe cutters 10, 10B shown in FIGS. 1A and 1B, the illustrated pipe cutter 110 is a hand-held, battery-operated power tool. As such, like parts have been given the same reference numerals plus 100. In addition, the features, and alternatives to the features, of the pipe cutter 110 described below may be used in the pipe cutters 10, 10B shown in FIGS. 1A and 1B.

The illustrated pipe cutter 110 includes an internal casing 116 positioned within the forward portion 22 and the handle portion 42 of the housing assembly 14 shown in FIGS. 1A and 1B. The internal casing 116 may be composed of a hard plastic material, a metal material, and/or any other material or combination of materials suitable for housing the various components of the pipe cutter 110. The casing 116 houses or supports various mechanical and/or electrical components of the pipe cutter 110 configured for conducting the cutting function of the pipe cutter 110.

Figure 3:
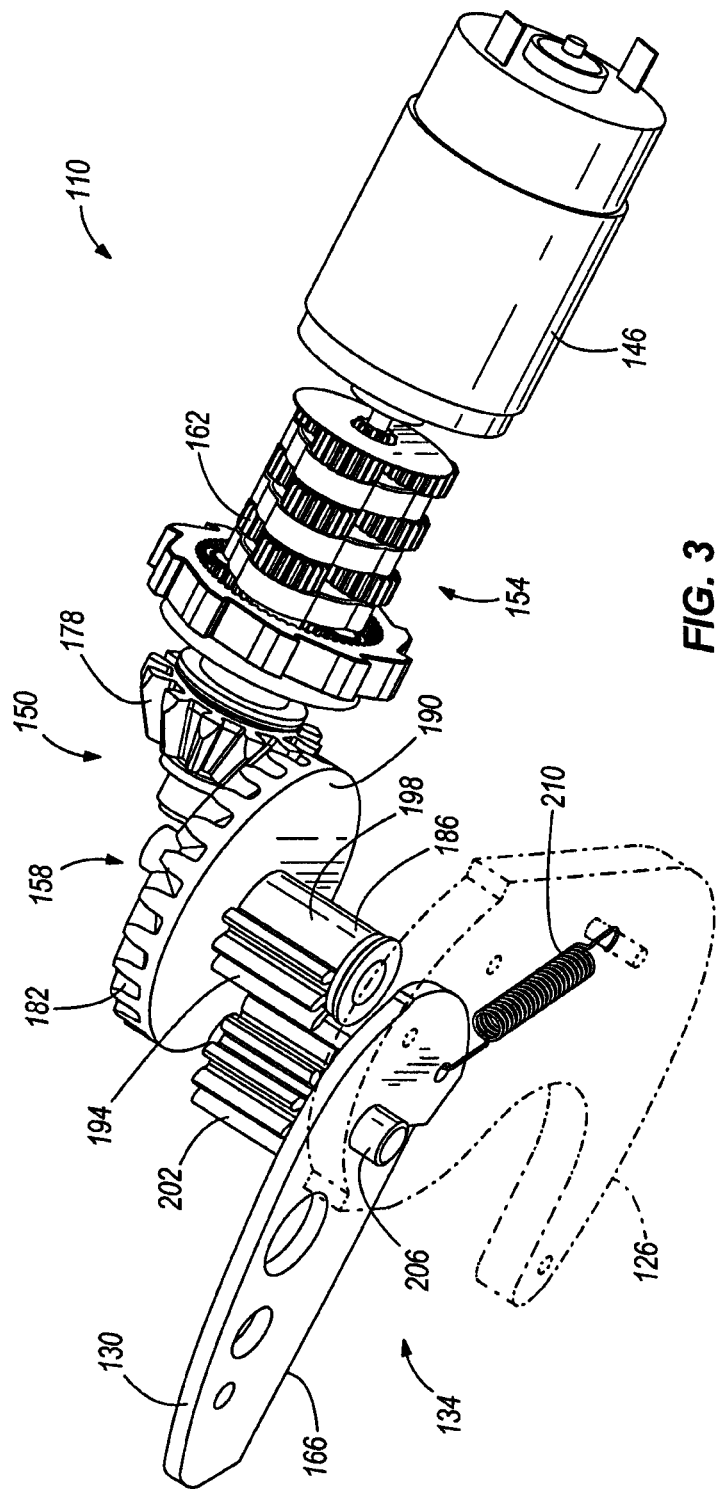
FIG. 3 is a perspective view of the pipe cutter shown in FIG. 2 with housing portions of the pipe cutter removed to illustrate internal gear mechanisms.

In the illustrated embodiment, the handle portion of the housing assembly supports a battery 138, a motor 146, and a drive mechanism 150 (FIG. 3). The pipe cutter 110 is operable to receive power from the battery 138. According to another embodiment, the pipe cutter 110 may be powered by alternating current (AC) power provided via a corded plug electrically coupled to a wall outlet or any number of suitable powering options.

The battery 138, or power supply, is removably coupled to the handle portion to provide power to the motor 146. In the illustrated embodiment, the battery 138 extends from a rearward end of the handle portion when coupled to the pipe cutter 110. The battery 138 may be coupled to the pipe cutter 110 via any number of suitable means, such as insertion, sliding, snapping, rotating, or other coupling activities. In other embodiments, the battery 138 may be a dedicated battery contained (e.g., partially or entirely housed) within the pipe cutter 110. When coupled to the handle portion, the battery 138 provides power directly to the motor 146 or may power the motor 146 through a control circuit (not shown). The control circuit controls various aspects of the pipe cutter 110, the motor 146, and/or the battery 138 and may also monitor operation of the pipe cutter 110 and its components.

As shown in FIG. 3, the drive mechanism 150 includes a drive assembly 154 and a cutting gear assembly 158. The drive assembly 154 is supported by the handle portion of the pipe cutter 110 and is powered by the motor 146 to drive the cutting gear assembly 158. In the illustrated embodiment, the drive assembly 154 includes a four-stage planetary gear reduction 162. In other embodiments, the drive assembly 154 may include different gear reductions. In yet another embodiment, the drive assembly 154 may include another type of gear configuration suitable to drive the cutting operation of the pipe cutter 110.

In the illustrated embodiment, the casing 116 supports the cutting gear assembly 158, a knife 130, and a pipe holder 126. The cutting gear assembly 158 is driven by the drive assembly 154 and operates to control cutting motion of the knife 130, which performs the cutting action of the pipe cutter 110. The knife 130 includes a blade 166 and is pivotally movable relative to the housing assembly 14 (FIGS. 1A and 1B), the casing 116, and the pipe holder 126. The knife 130 is formed from a hardened metal material suitable to cut pipes of various materials and of a size sufficient to cut through a desired pipe size. Together, the knife 130 and the pipe holder 126 define a slot 134 for receiving a pipe to be cut. The pipe holder 126, which is stationary relative to the housing assembly 14, is formed with a curved surface 170 facing the blade 166 of the knife 130. The curved surface 170 of the pipe holder 126 provides support for a pipe during the cutting action and helps to align the pipe to be cut. The pipe holder 126 may be integrally formed with the housing assembly 14 or may be separately coupled to the forward portion 22 of the housing assembly 14. The pipe holder 126 is formed from a hard plastic material, a metal material, and/or any other material or combination of materials suitable for supporting a pipe during the cutting activity.

In the illustrated embodiment, the pipe holder 126 includes a cover 174 that forms an exterior portion of the pipe cutter 110 and houses various mechanical and/or electrical components of the pipe cutter 110. The cover 174 may be integrally formed with the housing assembly 14, may be removably coupled to the forward portion 22, or may be permanently coupled to the forward portion 22. The cover 174 may be formed from a hard plastic material, a metal material, and/or any other material or combination of materials suitable for housing the various components of the pipe cutter 110. In the illustrated embodiment, the cover 174 is coupled to the forward portion 22 of the housing assembly 14 and the pipe holder 126. The portion of the cover 174 that is coupled to the holder 126 is formed with a curved surface of the same shape as the curved surface 170 of the pipe holder 126 such that the pipe holder 126 and the cover 174 cooperate to support a pipe during the cutting motion.

Figure 4:
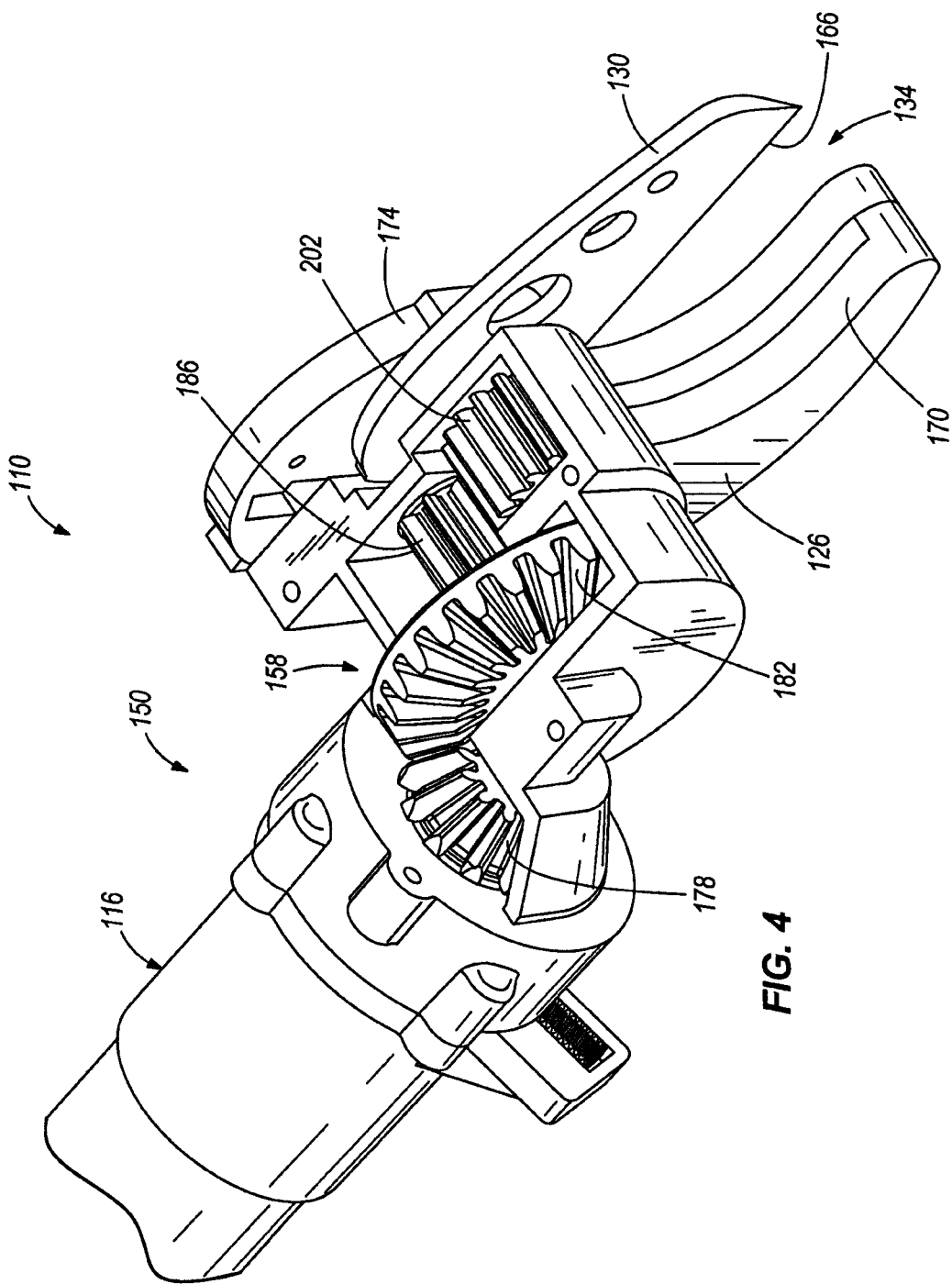
FIG. 4 is a perspective view of a portion of the pipe cutter shown in FIG. 2 with housing portions of the pipe cutter removed to illustrate internal gear mechanisms.
Figure 5:
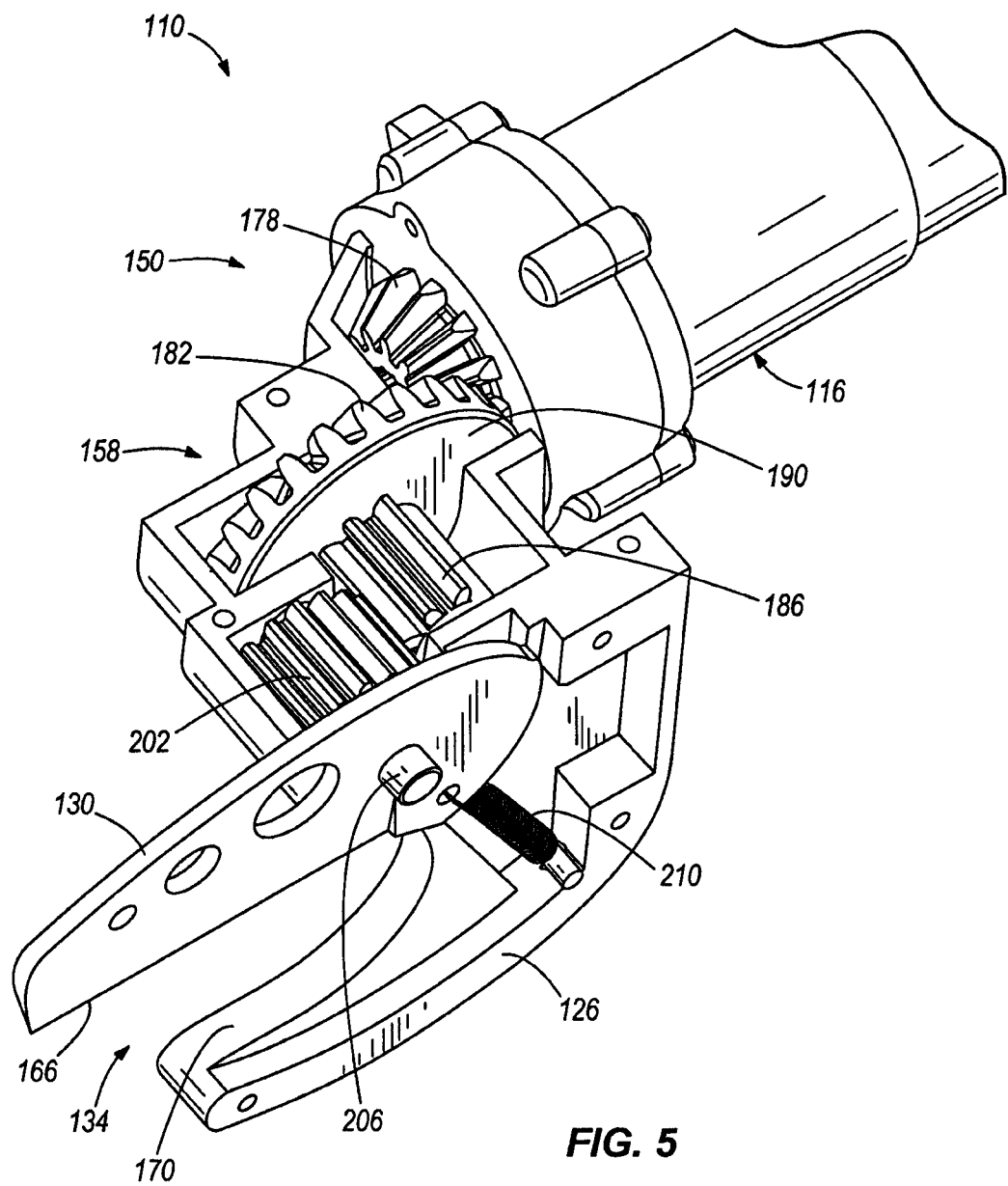
FIG. 5 is another perspective view of the portion of the pipe cutter shown in FIG. 4.

The cutting gear assembly 158 is coupled to and driven by the drive assembly 154 to pivot the knife 130 of the pipe cutter 110. The cutting gear assembly 158 may include various numbers of gears in various configurations. Referring to FIGS. 3-5, the cutting gear assembly 158 includes a first gear 178 driven by the drive assembly 154 and a second gear 182, whereby the first gear 178 engages and drives the second gear 182. In the illustrated embodiment, the first gear 178 and the second gear 182 are bevel gears, although in further embodiments, the first and second gears 178, 182 may be other types of gears.

Figure 6:
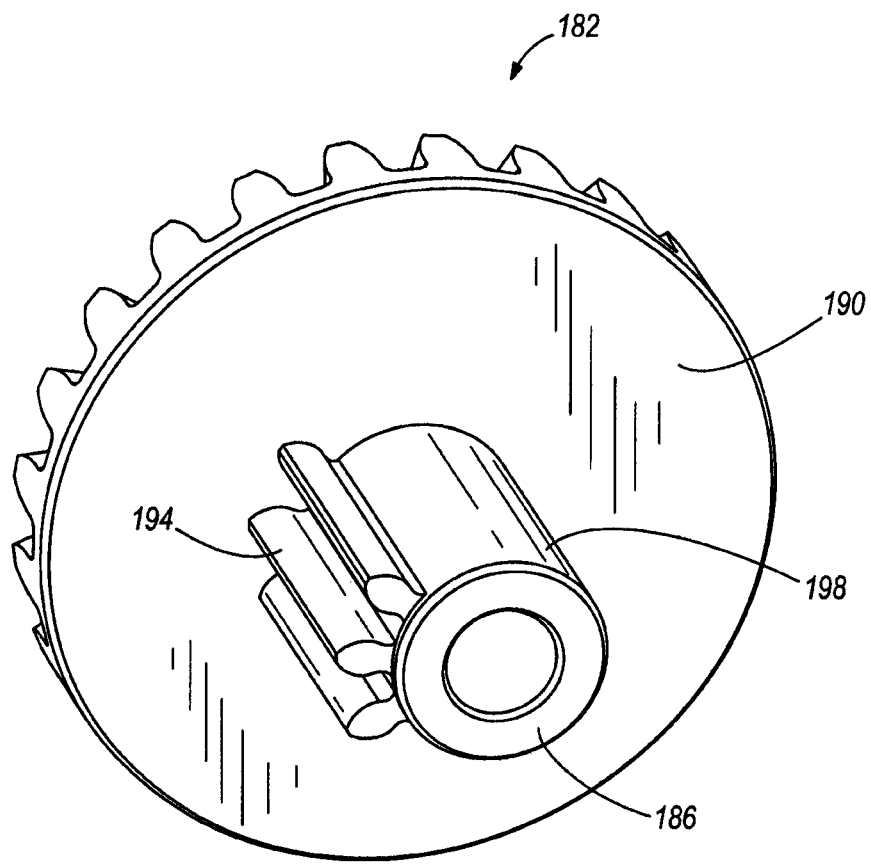
FIG. 6 is a perspective view of a bevel gear with a spline for use in the pipe cutter shown in FIG. 2.

The second gear 182 includes a spline 186 (also shown in FIG. 6), or spur gear, that extends outward from a rear face 190 of the second gear 182. The spline 186 may be integrally formed with the second gear 182 or may be separately coupled to the second gear 182. The spline 186 includes a toothed portion 194 and a non-toothed portion 198. The spline 186 may include teeth formed on less than half of the circumference of the spline 186. In the illustrated embodiment, the teeth are formed on approximately 90° of the spline 186 circumference, which will result in the knife 130 pivoting 90° during the cutting motion, as discussed below. In embodiments in which the knife 130 pivots less than 90°, the teeth are formed on less than 90° of the spline 186 circumference. Alternatively, in embodiments in which the knife 130 pivots more than 90°, the teeth are formed on more than 90° of the spline circumference.

The cutting gear assembly 158 includes a third gear 202, which is a driven gear that causes the cutting motion of the knife 130. In the illustrated embodiment, the third gear 202 intermeshes with and is driven by the toothed portion 194 of the spline 186; however, the non-toothed portion 198 of the spline 186 does not engage the third gear 202.

Referring to FIGS. 2-5, one end of the knife 130 is rotatably coupled to the third gear 202 at a pivot point defined by a gear shaft 206. The knife 130 is normally biased upward and away from the pipe holder 126 to a first position for receiving a pipe within the slot 134. A spring 210 (FIGS. 3 and 5) extends between the knife 130 and the pipe holder 126 to bias the knife 130 to the first position. In the illustrated embodiment, the spring 210 is an extension spring attached to the internal casing 116 at one end and to the knife 130 at an opposite end. As the third gear 202 rotates, the knife 130 pivots about the pivot point toward the pipe holder 126. The degree that the knife 130 pivots corresponds with the angular distance of the toothed portion 194 of the spline 186. In the illustrated embodiment, the cover 174 encloses an interior area of the pipe holder 126, which contains the spring 210 and the pivot point.

In a further embodiment, the spline 186 is fully toothed (e.g., a full spur gear) and the knife 130 may be returned to the initial position, or the first position, by other means than the spring, such as by reversing the motor 146.

During operation of the pipe cutter 110, a user positions a pipe in the slot 134 such that the pipe rests on the curved surface 170 of pipe holder 126. A user electrically couples the power supply 138 to the motor 146 (e.g., by actuating a switch assembly or circuit) to power the motor 146 and, thereby, drive the drive assembly 154. The drive assembly 154 intermeshes with and drives the first gear 178 of the cutting gear assembly 158, which rotates the second gear 182. As the second gear rotates 182, the spline 186 also rotates. When the toothed portion 194 of the spline 186 engages the third gear 202, the third gear 202 rotates to pivot the knife 130.

As the third gear 202 rotates, the knife 130 pivots toward the pipe holder 126 such that the blade 166 of the knife 130 cuts through a pipe (not shown) positioned in the slot 134. The pivot range of the knife 130 corresponds to the arc length of the toothed portion 194 on the spline 186. In the illustrated embodiment, after the toothed portion 194 of the spline 186 rotates past the third gear 202, the knife 130 will have completed the pipe cut and cutting motion. When the non-toothed portion 198 of the spline 186 is adjacent to the third gear 202, the spline 186 and the third gear 202 do not engage such that the spring 210 (FIGS. 3 and 5) biases the knife 130 away from the pipe holder 126 to the first position. The knife 130 is then in position for the next cutting operation.

Figure 7:
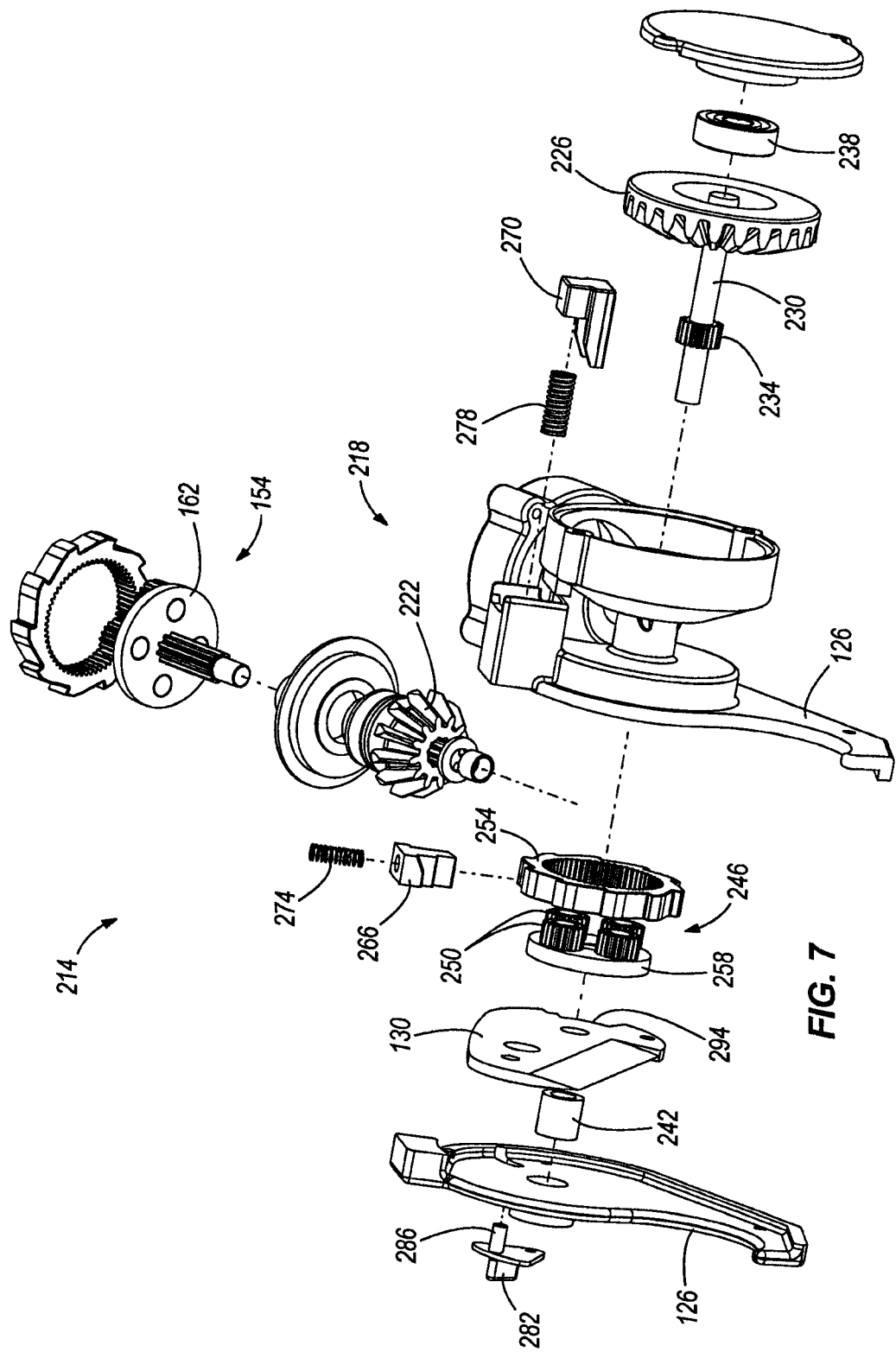
FIG. 7 is an exploded perspective view of a portion of a pipe cutter according to yet another embodiment of the invention.
Figure 8:
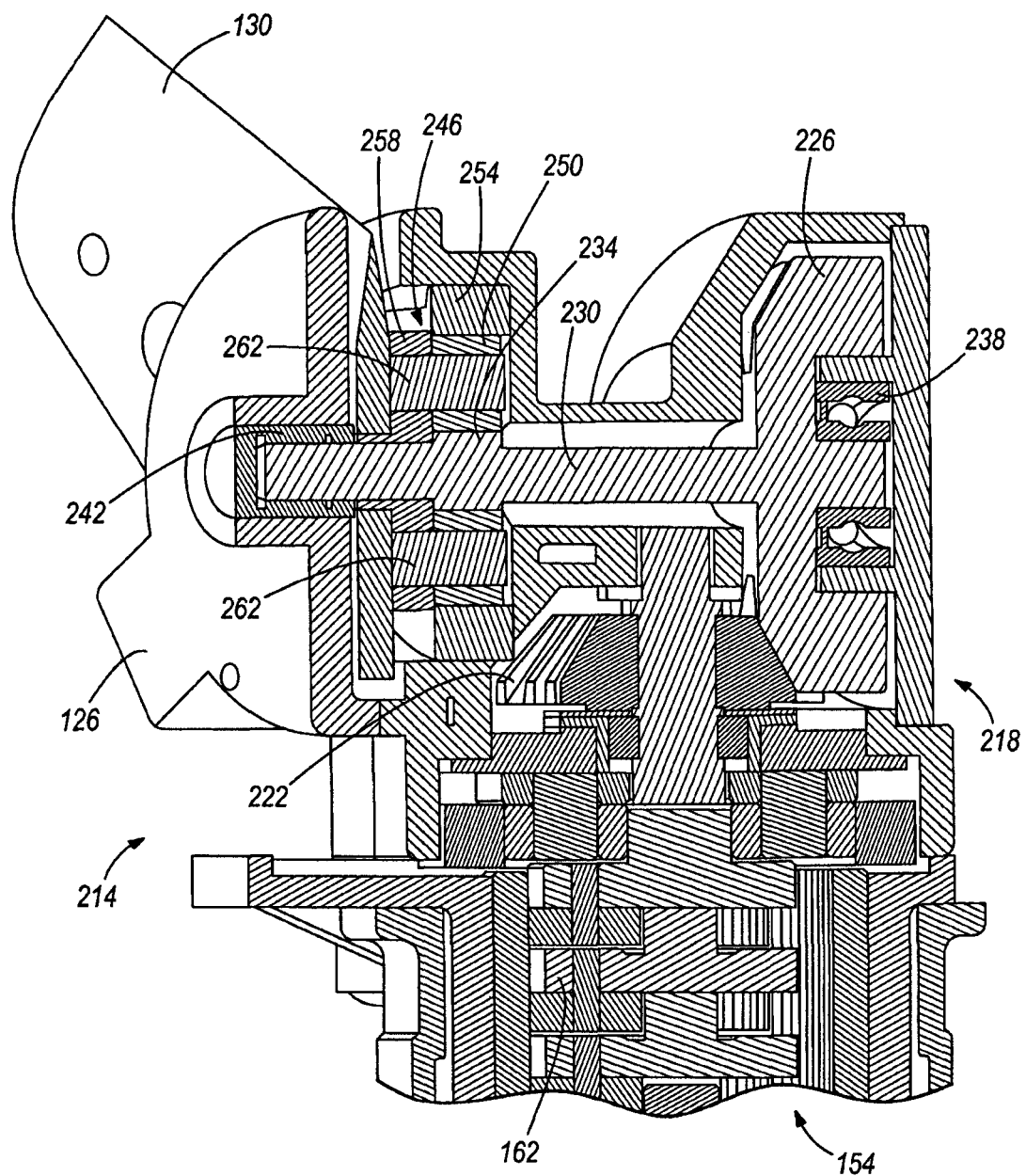
FIG. 8 is a cross-sectional view of the portion of the pipe cutter shown in FIG. 7.

FIGS. 7 and 8 illustrate another embodiment of a drive mechanism 214 for use with the pipe cutters 10, 10B, 110 of FIGS. 1A-5. The drive mechanism 214 includes the drive assembly 154 shown in FIG. 3, but includes another gear assembly 218 to pivot the knife 130 relative to the pipe holder 126. The illustrated gear assembly 218 includes a first gear 222 driven by the drive assembly 154 and a second gear 226, whereby the first gear 222 engages and drives the second gear 226. In the illustrated embodiment, the first gear 222 and the second gear 226 are bevel gears, although in further embodiments, the first and second gears 222, 226 may be other types of gears.

As shown in FIGS. 7 and 8, the second gear 226 includes an elongated shaft 230 having a spline 234. The elongated shaft 230 extends axially outward from the second gear 226 through the knife 130. Bearings 238, 242 are positioned about opposite ends of the shaft 230 to support and guide the shaft 230 during rotation.

The gear assembly 218 also includes a planetary gear reduction 246. The planetary gear reduction 246 is positioned about the elongated shaft 230 and includes four planetary gears 250, a ring gear 254, and a driven gear 258. The spline 234 engages the planetary gears 250 such that, as the second gear 226 is rotated, the planetary gears 250 move about the shaft 230 within the ring gear 254. The driven, or output, gear 258 is coupled to the planetary gears via short rods 262 (FIG. 8) such that the driven gear 258 rotates as the planetary gears 250 move within the ring gear 254. The driven gear 258 also engages the knife 130 to output rotation of second gear 226 to the knife 130 at a reduced speed. In some embodiments, the four-stage planetary gear reduction 162 of the drive assembly 154 may be omitted or modified since the planetary gear reduction 246 in the gear assembly 218 also reduces the speed of rotation from the motor 146.

As shown in FIG. 7, the drive mechanism 218 includes a lock key 266 and a key release button 270. The lock key 266 is biased by a spring 274 to engage the ring gear 254 to prevent rotation of the ring gear 254 relative to the pipe holder 126. In this position, the planetary gear reduction 246 transmits rotation of the second gear 226 to the knife 130. The key release button 270, or actuator, is positioned adjacent to the lock key 266 and extends partially out of the pipe holder 126. A spring 278 biases the button 270 slightly apart from the lock key 266 such that the button 270 does not disengage the lock key 266 from the ring gear 254. When the key release button 270 is depressed by a user against the bias of the spring 278, the button 270 lifts the lock key 266 out of engagement with the ring gear 254. In this position, the ring gear 254 can rotate relative to the pipe holder 126 such that rotation of the second gear 226 is not transmitted to the knife 130, and rotation of the knife 130 is not transmitted to the second gear 226. The user can thereby manually pivot the knife 130 away from the pipe holder 126 without having to reverse the motor 146.

The drive mechanism 218 also includes a size switch 282 coupled to the pipe holder 126. The size switch 282 allows a user to limit the size of the slot 134 (FIG. 2) by only allowing the knife 130 to pivot apart from the pipe holder 126 at set increments. In the illustrated embodiment, the size switch 282 includes a pin 286 extending through a curved slot 290 in the pipe holder 126. The pin 286 engages a stepped surface 294 formed on the knife 130 to limit the pivot range of the knife 130 relative to the pipe holder 126. In the illustrated embodiment, the stepped surface 294 of the knife 130 includes three steps such that the user can limit the size of the slot 134 to one of three sizes. In other embodiments, the stepped surface 294 can include fewer or more steps to limit the size of the slot 134 to larger and/or smaller sizes, or the stepped surface 294 may be formed to allow for continuous resizing of the slot 134.

FIGS. 9-12 illustrate a portion of a pipe cutter 310 according to yet another embodiment of the invention. Similar to the pipe cutters 10, 10B shown in FIGS. 1A and 1B, the illustrated pipe cutter 310 is a hand-held, battery-operated power tool. As such, like parts have been given the same reference numerals plus 300. In addition, the features, and alternatives to the features, of the pipe cutter 310 described below may be used in the pipe cutters 10, 10B shown FIGS. 1A and 1B.

Similar to the previous embodiments, the pipe cutter 310 includes a knife 330, a pipe holder 326, and a drive mechanism 350. The illustrated drive mechanism 350 includes a screw 354, a coupling block 358, and a pair of links 362, 366. The screw 354 is formed as an elongated threaded rod and is rotatably driven in a forward and/or a reverse direction by a drive assembly (not shown). In some embodiments, the drive assembly may be, for example, a dedicated drive assembly of an existing power tool or the drive assembly 154 discussed with reference to FIGS. 2-8.

The screw 354 extends, and is rotatably movable, through a threaded hole in the coupling block 358. The coupling block 358 is pivotally coupled to a rear portion 370, 374 of each of the links 362, 366, which extend outward from and on opposite sides of a driven end of the screw 354. Forward ends 378, 382 of the links 362, 366 are coupled to the knife 330 and the pipe holder 326, respectively, to pivotally move the knife 330 and the pipe holder 326 toward and away from each other.

Figure 9:
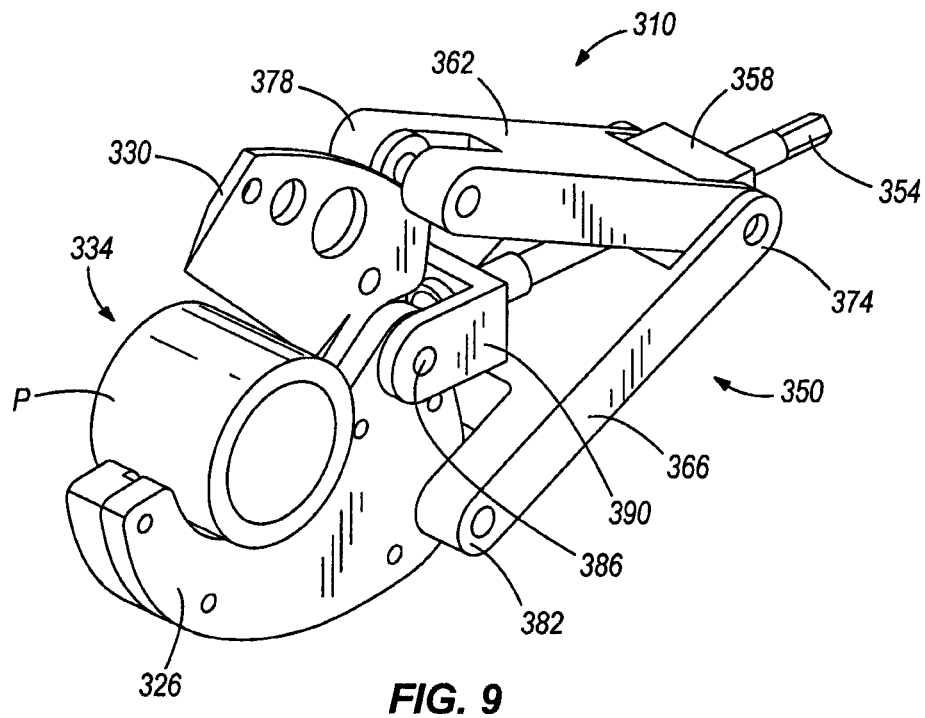
FIG. 9 is a perspective view of a portion of a pipe cutter according to still another embodiment of the invention.
Figure 10:
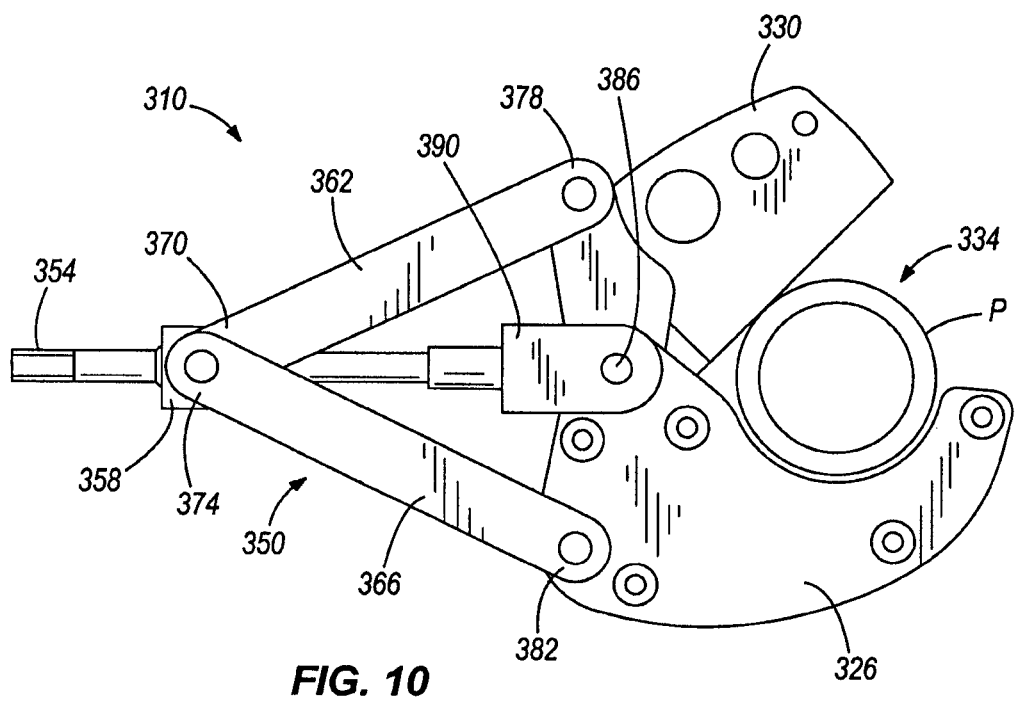
FIG. 10 is a side view of the portion of the piper cutter shown in FIG. 9.
Figure 11:
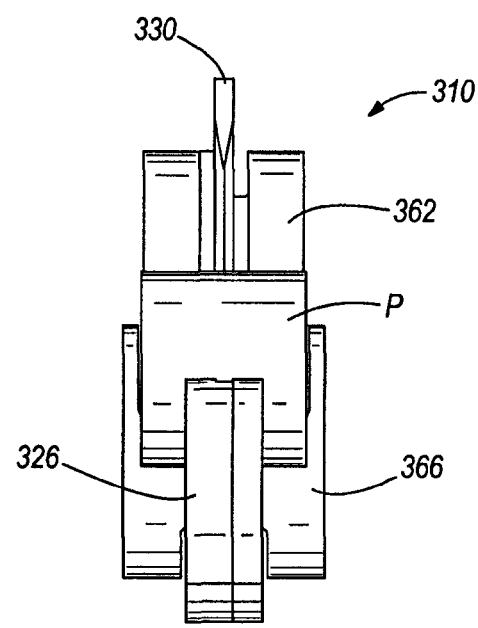
FIG. 11 is an end view of the portion of the pipe cutter shown in FIG. 9.
Figure 12:
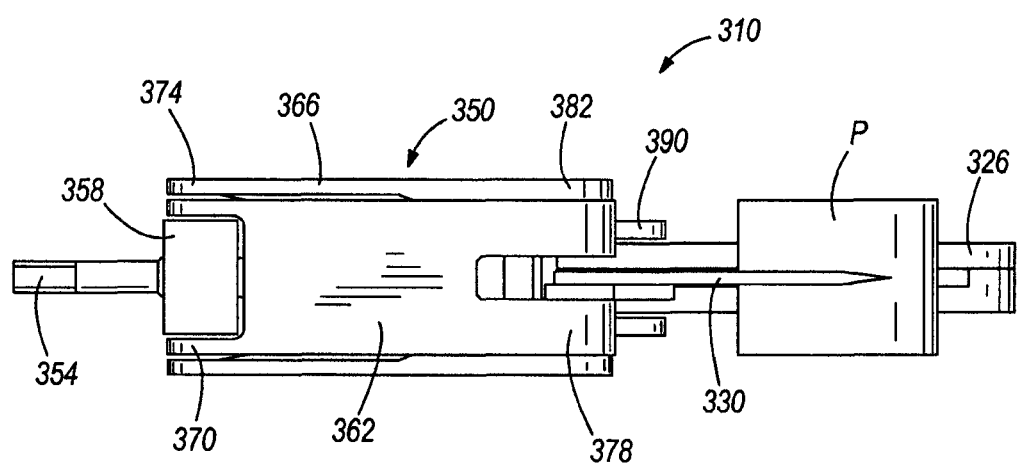
FIG. 12 is a top view of the portion of the pipe cutter shown in FIG. 9.

The knife 330 is configured to perform the cutting action of the pipe cutter 310, and the pipe holder 326 provides support for a pipe P to be cut. Together, the knife 330 and the pipe holder 326 define a slot 334 to receive the pipe P to be cut. As shown in FIGS. 9 and 10, the knife 330 and the pipe holder 326 are pivotally coupled together at a pivot point 386 defined by a generally U-shaped bracket 390. The illustrated bracket 390 is coupled to the knife 330 and the pipe holder 326 and is coupled to a forward end of the screw 354 such that the screw 354 rotates within the bracket 390 when driven.

During operation of the piper cutter 310, a user positions the pipe P in the slot 334 between the pipe holder 330 and the knife 326. The user activates the drive mechanism 350 (e.g., with a power supply and a motor) to rotate the screw 354 and drive the coupling block 358. Rotating the screw 354 in the forward direction drives the coupling block 358 and the rear portions 370, 374 of the links 362, 366 toward the forward end of the screw 354 (i.e., toward the bracket 390). As the links 362, 366 move forward, the forward ends 378, 382 of the links 362, 366 pivot away from each other, pushing the knife 330 and the pipe holder 326, respectively. The knife 330 and the pipe holder 326 thereby pivot about the pivot point 386 toward one another to cut the pipe P with the knife 330.

Rotating the screw 354 in the reverse direction drives the coupling block 358 and the rear portions 370, 374 of the links 362, 366 away from the forward end of the screw 354 (i.e., away from the bracket 390). As the links 362, 366 move backward, the forward ends 378, 382 of the links 362, 366 pivot toward each other, pulling the knife 330 and the pipe holder 326, respectively. The knife 330 and the pipe holder 326 thereby pivot about the pivot point 386 away from one another to enlarge the slot 334 defined between the knife 330 and the pipe holder 326.

Although the invention has been described in detail with reference to certain preferred embodiments, variations and modifications exist within the scope and spirit of one or more independent aspects of the invention as described. Various features and advantages are set forth in the following claims.

What is claimed is:

1. A power tool comprising:
   a pipe holder;
   a knife pivotally coupled to the pipe holder;
   a drive mechanism coupled to at least one of the pipe holder and the knife at a pivot point, the drive mechanism operable to provide a driving force at the pivot point to move the at least one of the pipe holder and the knife relative to the other of the pipe holder and the knife,
   wherein the at least one of the pipe holder and the knife is operable to pivot through an angle toward the other of the pipe holder and the knife during a cutting motion, and
   wherein the at least one of the pipe holder and the knife is operable to pivot through the angle away from the other of the pipe holder and the knife during a return motion;
   a motor coupled to the drive mechanism; and
   a power supply electrically coupled to the motor to selectively power the motor for operating the drive mechanism,
   wherein the drive mechanism includes a gear assembly coupled to the at least one of the pipe holder and the knife to move the at least one of the pipe holder and the knife relative to the other of the pipe holder and the knife,
   wherein the gear assembly includes a planetary gear reduction coupled to the knife to move the knife relative to the pipe holder, and
   wherein the planetary gear reduction includes an outer ring, and wherein the drive mechanism includes a lock key operable to engage the outer ring to inhibit rotation of the outer ring relative to pipe holder, and an actuator movable relative to the lock key to disengage the lock key from the outer ring to allow rotation of the outer ring relative to the pipe holder.

2. The power tool of claim 1, and further comprising a spring positioned between the pipe holder and the knife to bias the knife away from the pipe holder.

3. The power tool of claim 1, wherein the pipe holder and the knife define a slot configured to receive a pipe, wherein the drive mechanism includes a switch coupled to the pipe holder, and wherein a portion of the switch is operable to engage a portion of the at least one of the pipe holder and the knife to adjust the size of the slot.

4. The power tool of claim 1, wherein the power supply is a battery pack electrically coupled to the motor.

5. The power tool of claim 4, wherein the battery pack is a Lithium-ion based battery pack.

6. The power tool of claim 4, wherein the battery pack is a power tool battery pack usable with the power tool and another power tool.

7. A power tool comprising:
a housing assembly supporting a motor and a drive mechanism;
a pipe holder coupled to the housing assembly, the pipe holder configured to support a pipe;
a knife pivotally coupled to the pipe holder; and
a battery coupled to the housing assembly, the battery electrically coupled to the motor to selectively power the motor to drive the drive mechanism, the drive mechanism operable to provide a driving force about a pivot point to move the knife relative to the pipe holder to cut the pipe supported by the pipe holder,
wherein the knife is operable to pivot through an angle toward the pipe holder during a cutting motion,
wherein the knife is operable to pivot through the angle away from the pipe holder during a return motion,
wherein the drive mechanism includes a gear assembly coupled to the knife to move the knife relative to the pipe holder,
wherein the gear assembly includes a planetary gear reduction coupled to the knife to move the knife relative to the pipe holder, and
wherein the planetary gear reduction includes an outer ring, and wherein the drive mechanism includes a lock key operable to engage the outer ring to inhibit rotation of the outer ring relative to the pipe holder, and an actuator movable relative to the lock key to disengage the lock key from the outer ring to allow rotation of the outer ring relative to the pipe holder.

8. The power tool of claim 7, and further comprising a spring positioned between the pipe holder and the knife to bias the knife away from the pipe holder.

9. The power tool of claim 7, wherein the pipe holder remains generally stationary relative to the housing assembly when the knife moves relative to the pipe holder.

10. The power tool of claim 7, wherein the pipe holder and the knife define a slot configured to receive a pipe, wherein the drive mechanism includes a switch coupled to the pipe holder, and wherein a portion of the switch is operable to engage a portion of the knife to adjust the size of the slot.

11. The power tool of claim 7, wherein the battery is a Lithium-ion based battery pack.

12. The power tool of claim 7, wherein the battery is a power tool battery pack usable with the power tool and another power tool.

13. A pipe cutter comprising:
a housing assembly;
a pipe holder coupled to the housing assembly;
a knife pivotally coupled to the pipe holder, the knife and the pipe holder defining a slot therebetween for receiving a pipe;
a drive mechanism positioned at least partially within the housing assembly and coupled to at least one of the pipe holder and the knife, the drive mechanism operable to provide a driving force about a pivot point to move the at least one of the pipe holder and the knife relative to the other of the pipe holder and the knife to cut the pipe positioned within the slot,
wherein the at least one of the pipe holder and the knife is operable to pivot through an angle toward the other of the pipe holder and the knife during a cutting motion, and
wherein the at least one of the pipe holder and the knife is operable to pivot through the angle away from the other of the pipe holder and the knife during a return motion;
a motor positioned at least partially within the housing assembly and coupled to the drive mechanism; and
a battery pack removably coupled to the housing assembly, the battery pack electrically coupled to the motor to selectively power the motor to operate the drive mechanism for moving the at least one of the pipe holder and the knife relative to the other of the pipe holder and the knife,
wherein the drive mechanism includes
a planetary gear reduction having an outer ring, the planetary gear reduction coupled to the knife to move the knife relative to the pipe holder,
a lock key operable to engage the outer ring to inhibit rotation of the outer ring relative to the pipe holder, and
an actuator movable relative to the lock key to disengage the lock key from the outer ring to allow rotation of the outer ring relative to the pipe holder.

14. The pipe cutter of claim 13, wherein the drive mechanism includes a switch coupled to the pipe holder, and wherein a portion of the switch is operable to engage a portion of the knife to adjust the size of the slot.

15. The pipe cutter of claim 13, wherein the battery pack is a Lithium-ion based battery pack.

16. The pipe cutter of claim 13, wherein the battery pack is a power tool battery pack usable with the pipe cutter and another power tool.

* * * * *

UNITED STATES PATENT AND TRADEMARK OFFICE
CERTIFICATE OF CORRECTION

PATENT NO. : 8,683,704 B2  Page 1 of 1
APPLICATION NO. : 12/667216
DATED : April 1, 2014
INVENTOR(S) : Scott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Twenty-ninth Day of September, 2015

Michelle K. Lee
*Director of the United States Patent and Trademark Office*